United States Patent [19]

Tamura et al.

[11] 4,097,576

[45] Jun. 27, 1978

[54] REDUCTION CATALYST FOR REMOVAL OF NITROGEN OXIDES IN EXHAUST GAS

[75] Inventors: Takaaki Tamura, Tokyo; Norihiko Fujita, Musashinoshi; Chihiro Matsuura, Tokyo; Wataru Ito, Hachiojishi; Naoki Negishi, Tokyo, all of Japan

[73] Assignee: Kogyo Kaihatsu Kenkyusho (Industrial Research Institut), Tokyo, Japan

[21] Appl. No.: 663,833

[22] Filed: Mar. 4, 1976

[30] Foreign Application Priority Data

Mar. 8, 1975  Japan ................................. 50-28408

[51] Int. Cl.² .............................................. B01D 53/34
[52] U.S. Cl. ................................ 423/239 A; 252/454; 252/455 Z
[58] Field of Search ............... 423/213.2, 213.5, 213.7, 423/239; 60/301; 252/454, 455 Z

[56] References Cited

U.S. PATENT DOCUMENTS

| | | | |
|---|---|---|---|
| 3,346,328 | 10/1967 | Sergeys et al. | 423/213.2 |
| 3,436,356 | 4/1969 | Kato et al. | 423/213.2 X |
| 3,449,063 | 6/1969 | Griffing et al. | 423/213.5 |
| 3,476,508 | 11/1969 | Kearby et al. | 423/239 X |
| 3,656,915 | 4/1972 | Tourtellotte | 423/213.5 X |
| 3,873,469 | 3/1975 | Foster | 423/213.5 X |
| 4,013,588 | 3/1977 | Tamura | 423/239 |

FOREIGN PATENT DOCUMENTS 804,316  2/1974  Belgium ............................. 423/239

*Primary Examiner*—G. O. Peters
*Attorney, Agent, or Firm*—Burgess, Ryan and Wayne

[57] ABSTRACT

A reduction catalyst is disclosed. This catalyst comprises a naturally-occurring inorganic material which is a tuff consisting essentially of $SiO_2$, $Al_2O_3$ and $H_2O$ containing 1–10% by weight of an alkali metal oxide and an alkaline earth metal oxide and has an X-ray diffraction pattern as shown in Table A or Table B. It is produced by depositing of the tuff metal ions selected from the group consisting of a metal belonging to Ib Group, IIb Group and VIII Group of Periodic Table, chromium, vanadium and manganese, followed by heat treatment, and repeating the same using different metal ions on each occasion. The catalyst is useful as a reduction catalyst for nitrogen oxides.

4 Claims, No Drawings

REDUCTION CATALYST FOR REMOVAL OF NITROGEN OXIDES IN EXHAUST GAS

BACKGROUND OF THE INVENTION

1. Field of the Invention

The present invention relates to process of producing reduction catalysts for the removal of nitrogen oxides (referred to as $NO_x$ hereinafter).

2. Description of the Prior Art

It has been proposed to remove nitrogen monoxide (referred to as NO hereinafter) contained in waste gas using a reduction catalyst which is obtained by grinding into powders naturally-occurring inorganic materials which are tuff consisting essentially of $SiO_2$, $Al_2O_3$ and $H_2O$ containing 1–10% by weight of alkali metal oxides and alkaline earth metal oxides and having inherent X-ray diffraction pattern and heat-treating the powders (See U.S. application Ser. No. 467,085 filed May 6, 1974 now U.S. Pat. No. 4,013,588. According to this process, NO contained in dry waste gas is first oxidized by adding at least a small amount of oxygen to the dry waste gas to convert NO into nitrogen dioxide (often referred to as $NO_2$). After $NO_2$ in the waste gas is adsorbed onto the reduction catalyst the $NO_2$ adsorbed is removed by desorption upon heating, whereby the reduction catalyst is reactivated to be prepared for re-use.

However, difficulties are encountered in practicing the process when the water content of waste gas to be treated is high, for example, 10 to 15% by volume. Further, the process requires high temperature for desorption removal of $NO_2$ adsorbed. When the NO content in waste gas is low, the process is disadvantageous from an econommical standpoint because costs necessary to remove NO become relatively high. It is thus undesirable for removal of NO in waste gas exhausted from a boiler, while the process can be adopted to remove NO in waste gas exhausted from factories manufacturing nitric acid.

Processes for removing nitrogen oxides (referred to as $NO_x$) contained in waste gas after reducing $NO_x$ have also been proposed see U.S. application Ser. No. 505,046 filed on Sept. 12, 1974 now abandoned and refiled in a divisional application on Jan. 26, 1976 as U.S. Ser. No. 652,064. In these processes, substances which are obtained by treating (preferably, immersing) naturally-occurring inorganic materials comprising tuff ground into particles of an adequate size as a carrier with a solution containing one or more metal ions selected from the group consisting of Ib Group metals (Cu, Ag and Au), IIb Group metals (Zn, Cd, etc.), VIII Group metals (Fe, Co, Ni, Pd, etc.), Cr and Mn, or if necessary, followed by heat treatment at temperatures of 100° to 900° C are employed as a catalyst.

However, when these catalysts are utilized to selectively reduce $NO_x$ in waste gas exhausted from boilers (especially from boilers using LNG), for example, referring to the case using a Fe-carried catalyst, reaction temperatures for reduction of $NO_x$ require 320° to 380° C in order to obtain a denitration rate of more than 90% at a space velocity of 10,000 $hr^{-1}$. Further, the temperature range is merely a 60° range which is relatively narrow.

For the purpose of proper application of these known catalysts to such special operations it is desired to further lower the reaction temperatures for reduction of $NO_x$ and to further broaden the temperature range. In addition, it is desired to further extend the life of the catalyst.

The present invention satisfies these requirements. After continuous investigations, the inventors have found that the aforementioned problem can be solved by performing multiple immersions of the tuff in metal ion-containing solutions. Each immersion is followed by calcination using a solution containing different kinds of one or more metal ions on each occasion the previous immersion.

SUMMARY OF THE INVENTION

An object of this invention is to provide a process of producing reduction catalysts suitable for removing $NO_x$ contained in waste gas.

DETAILED DESCRIPTION OF THE INVENTION

The present invention is characterized in that (1) a carrier comprising a naturally-occurring inorganic material which is mainly composed of tuff consisting essentially of $SiO_2$, $Al_2O_3$ and $H_2O$ containing 1–10% by weight of alkali metal oxides and alkaline earth metal oxides, which has an X-ray diffraction pattern as shown in Table A or Table B hereinbelow is, if necessary, pre-treated either with a solution containing ammonium ions or a solution not exceeding 2N HCl and suitably a 1N to 2N HCl solution or a solution not exceeding 2N HCl and suitably a 1N to 2N HCl solution, and then treated with a solution containing one or more metal ions selected from the group consisting of Ib Group metals, IIb Group metals and VIII Group metals of Periodic Table, chromium, vanadium and manganese to carry metals thereon, which is followed by heat treatment, and (2) the treatment with a solution containing one or more metal ions followed by heat treatment is repeated once or more times using a solution(s) containing different metal ions on each occasion.

The naturally occurring inorganic materials which can be used in the present invention have an X-ray diffraction pattern shown in Table A or Table B below.

Table A

| Interplanar Spacing A | Relative Intensities 10 I/I | Interplanar Spacing A | Relative Intensities 10 I/I |
|---|---|---|---|
| 13.9 ± 0.1 | 2 | 3.23 ± 0.03 | 6 |
| 9.1 ± 0.1 | 4 | 3.10 ± 0.03 | 0 – 1 |
| 6.6 ± 0.1 | 4 | 2.90 ± 0.03 | 3 |
| 6.5 ± 0.1 | 2 | 2.85 ± 0.03 | 0 – 2 |
| 6.1 ± 0.1 | 2 | 2.71 ± 0.03 | 1 |
| 5.83 ± 0.05 | 2 | 2.58 ± 0.03 | 1 |
| 4.55 ± 0.05 | 2 | 2.53 ± 0.03 | 2 |
| 4.30 35 0.10 | 0 – 5 | 2.49 ± 0.03 | 0 – 4 |
| 4.26 ± 0.10 | 0 – 2 | 2.47 ± 0.03 | 0 – 3 |
| 4.08 ± 0.10 | 0 – 4 | 2.45 ± 0.03 | 0 – 2 |
| 4.05 ± 0.10 | 0 – 6 | 2.04 ± 0.03 | 2 |
| 4.01 ± 0.05 | 7 | 1.96 ± 0.03 | 1 |
| 3.85 ± 0.03 | 2 | 1.88 ± 0.02 | 1 |
| 3.81 ± 0.10 | 0 – 4 | 1.82 ± 0.02 | 1 |
| 3.77 ± 0.05 | 1 | 1.82 ± 0.02 | 0 – 2 |
| 3.48 ± 0.03 | 10 | 1.79 ± 0.02 | 1 |
| 3.40 ± 0.03 | 5 | 1.53 ± 0.02 | 1 |
| 3.35 ± 0.10 | 0 – 8 | | |

Table B

| Interplanar Spacing A | Relative Intensities 10 I/I | Interplanar Spacing A | Relative Intensities 10 I/I |
|---|---|---|---|
| 9.10 ± 0.1 | 7 | 3.18 ± 0.03 | 4 |
| 7.99 ± 0.1 | 4 | 3.15 ± 0.03 | 4 |
| 6.82 ± 0.1 | 2 | 2.99 ± 0.03 | 0 – 1 |
| 5.85 ± 0.08 | 5 | 2.98 ± 0.03 | 4 |

Table B-continued

| Interplanar Spacing A | Relative Intensities 10 I/I | Interplanar Spacing A | Relative Intensities 10 I/I |
|---|---|---|---|
| 5.29 ± 0.08 | 2 | 2.89 ± 0.03 | 4 |
| 5.12 ± 0.05 | 3 | 2.85 ± 0.03 | 0 – 2 |
| 4.67 ± 0.05 | 2 | 2.81 ± 0.03 | 3 |
| 4.30 ± 0.10 | 0 – 5 | 2.74 ± 0.03 | 1 |
| 4.26 ± 0.10 | 0 – 2 | 2.53 ± 0.02 | 2 |
| 4.08 ± 0.10 | 0 – 4 | 2.49 ± 0.03 | 0 – 4 |
| 4.05 ± 0.10 | 0 – 6 | 2.47 ± 0.03 | 0 – 3 |
| 3.98 ± –.05 | 10 | 2.46 ± 0.02 | 2 |
| 3.85 ± 0.05 | 2 | 2.45 ± 0.03 | 0 – 2 |
| 3.81 ± 0.10 | 0 – 4 | 2.02 ± 0.02 | 0.5 |
| 3.77 ± 0.05 | 2 | 1.95 ± 0.02 | 0.05 |
| 3.47 ± 0.03 | 7 | 1.87 ± 0.02 | 0.5 |
| 3.34 ± 0.10 | 0 – 8 | 1.81 ± 0.02 | 0 – 2 |
| 3.35 ± 0.03 | 5 | 1.72 ± 0.02 | 0.5 |
| 3.22 ± 0.03 | 4 | | |

X-ray diffraction patterns and the values of relative intensity 10 I/Io are somewhat varied depending upon test equipment, humidity, temperature to be tested and arrangement of crystals. In the tables above, a standard method was used. That is, radiation which was made by Kα-doublet of Cu was measured using a Geiger counter spectrometer equipped with a strip chart pen recorder. The maximum value and the position as $2\theta$ (wherein $\theta$ represents a Bragg angle) were read by a spectrometer chart. Based on the values, the relative intensities represented by:

$$10 \times I/Io$$

wherein $Io$ is an intensity of the strongest line and/or an intensity of $d$(obs), the interplanar spacing in A corresponding to the record lines, was corrected.

The material having an X-ray diffraction pattern shown in Table A occurs mainly in the Tohoku and Chugoku districts in Japan. The material defined in Table B occurs mainly in the Tohoku and Kyushu districts in Japan.

To prepare the catalyst of this invention, the carrier is prepared by grindng into powders of greater than 50 mesh, preferbly 2 to 10 mesh, rocks which are the naturally-occurring inorganic material defined above.

In the treatment of a gaseous mixture containg dilute $NO_x$ using the catalyst of this invention, it is sufficient to contact the gaseous mixture with the catalyst of this invention, whereby reduction of $NO_x$ proceeds satisfactorily. However, if reducing agents such as $H_2$, $CH_3OH$ (methanol), $NH_3$, CO, paraffins, olefins, etc. are added to the gaseous mixture in a small amount, reduction rate of $NO_x$ (i.e., rate of removing $NO_x$) and reaction rate thereof are extremely accelerated. The system is hardly influenced by $H_2O$, $CO_2$ and $O_2$ which are generally contained in the gaseous mixture in a large amount. The catalyst of the invention has such an extremely high selectivity that only $NO_x$ is reduced without influenced by $O_2$. Further, reduction rate is not affected even if $SO_2$ of about 1000 ppm co-exists in the system. Even when the reducing agent is contained either in a far lower amount or, a larger amount than a stoichiometric amount of $NO_x$, reducing rate is very high and $NH_3$ content in waste gas is small. Accordingly, it is unnecessary to vary the amount of reducing agent depending upon change of $NO_x$ content in waste gas.

Immersion treatment in the present invention is advantageously performed at temperatures of from 10° to 100° C, preferably 60° to 100° C, more preferably 90° to 100° C, for 5 to 120 mins.

Heat treatment after immersion treatment can be advantageously performed at temperatures of from 100° to 700° C, preferrably 200° to 400° C.

Selective reduction rate of $NO_x$ can further be improved when the aforementioned naturally-occurring inorganic material is used as a carrier after being subjected to pre-treatment with a solution containing ammonium ions, as for example, an aqueous ammonium chloride solution. Definite proof is lacking but the function is assumed to be based on that not only ammonium ions are substituted for metal ions originally present in the naturally occurring material but also the ammonium ions improve the affinity of metal-carried catalysts per se and therefore the effect of the metal is accelerated.

If the naturally occurring tuff is alternatively treated with hydrochloric acid similar to the pre-treatment with ammonium ions, the catalyst is particularly effective for removing $NO_x$ from exhaust gas containing $SO_2$. In more detail, the naturally occurring tuff in a powdery form is washed with 2N hydrochloric acid using a Soxhlet's extractor, preferably at 100° C for 30-92 hours. The HCl treated catalyst can satisfactorily prolong its life time even if exhaust gas to be treated contains substantial proportions of $SO_2$ gas therein.

In using the catalyst of the present invention, reaction temperatures for reducing $NO_x$ can be in the range of 200° to 380° C in order to obtain a denitration rate of greater than 90% at a space velocity of 10,000 hr$^{-1}$. The temperature range is thus broadened to a 180° C difference. The temperature "380° C" refers to the temperature indicated by combustion waste gas from a boiler for generation of electricity. As compared to catalysts which have been proposed and are obtained by immersion treatment with the same kind of metal as previous treatment and repeating the same twice, the temperature range of the catalysts of this invention is broadened by a 90° C range towards the lower temperature side. Further, life cycle of catalysts can further be extended.

The results of life test indicate that a life period of the catalyst of this invention is very long. In addition, the catalyst is inexpensive. Therefore, the cost to remove $NO_x$ can be reduced. The present invention provides excellent catalyst for removing $NO_x$.

EXAMPLE 1

A naturally-occurring inorganic material having an X-ray diffraction pattern shown in Table B hereinabove was ground into a powder of 6 to 8 mesh. The powder was immersed in a 1 mol/l aqueous copper nitrate solution at 100° C for 30 mins. and then heat-treated at 400° C in the air. Thereafter, the heat-treated powder was immersed in an aqueous solution containing 1 mol/l of iron nitrate and 0.2 mol/l of manganese nitrate at 100° C for 60 mins., which was followed by heat treatment in the air.

EXAMPLE 2

A naturally-occurring inorganic material having an X-ray diffraction pattern shown in Table A was ground into powder of 6 to 8 mesh. The powder was immersed in a 1 mol/l aqueous copper nitrate solution at 100° C. for 30 mins. and then heat-treated. The heat-treated powders was immersed in an aqueous solution containing 1 mol/l of iron nitrate and 0.2 mol/l of chromium nitrate at 100° C. for 60 mins., which was followed by heat treatment in the air.

EXAMPLE 3

A naturally-occurring inorganic material having an X-ray diffraction pattern shown in Table A was ground into a powder of 6 to 8 mesh. After the powder was pretreated with 1 mol/l aqueous ammonium chloride solution at normal temperature for 30 mins., the pretreated powder was immersed in a 1 mol/l aqueous copper nitrate solution at 100° C. for 30 min. followed by heat treatment in the air. The heat-treated powder was immersed in an aqueous solution containing 1 mol/l of iron nitrate and 0.2 mol/l of manganese nitrate at 100° C for 60 mins., followed by heat treatment in the air.

EXAMPLE 4

A naturally-occurring inorganic material having an X-ray diffraction pattern shown in Table A was ground into powder of 6 to 8 mesh. The powder was immersed in a 1 mol/l aqueous copper nitrate solution at 100° C for 30 mins. followed by heat treatment in the air. The heat-treated powders were immersed in an aqueous solution containing 1 mol/l of iron nitrate and 0.2 mol/l of manganese nitrate at 100° C for 60 mins, which was followed by heat treatment in the air.

TEST EXAMPLE 1

A packed column having a diameter of 28 mm. and a length of 100–150 mm. was employed as the equipment for the test. Using the catalysts obtained in Examples 1 through 4, reduction test of $NO_x$ in a sample gas comprising 10% of $CO_2$, 1% of $O_2$, 10% of $H_2O$ and the remaining of $N_2$ and $NO_x$ was performed to examine temperature characteristics of the catalysts. The space velocity was 10,000 $hr^{-1}$. The results are shown in Table 1.

Table 1

| Catalyst | NH₃ (ppm) | Temperature (° C) | Inlet NO (ppm) | Outlet NO (ppm) | Reduction Rate (%) |
|---|---|---|---|---|---|
| Catalyst of Ex. 1 | 130 | 285 | 103 | 2.2 | 97.9 |
| | 130 | 310 | 103 | 0.77 | 99.3 |
| | 130 | 350 | 103 | 0.43 | 99.6 |
| | 130 | 380 | 103 | 0.61 | 99.4 |
| Catalyst of Ex. 2 | 130 | 285 | 108 | 5.0 | 95.4 |
| | 130 | 305 | 108 | 2.5 | 97.7 |
| | 130 | 325 | 108 | 1.5 | 98.6 |
| | 130 | 355 | 108 | 1.7 | 98.4 |
| Catalyst of Ex. 3 | 130 | 250 | 115 | 14.9 | 87.0 |
| | 130 | 270 | 115 | 7.9 | 93.1 |
| | 130 | 290 | 115 | 4.6 | 96.0 |
| | 130 | 310 | 115 | 1.9 | 98.3 |
| | 130 | 330 | 115 | 0.9 | 99.2 |
| | 130 | 350 | 115 | 0.6 | 99.5 |
| | 130 | 370 | 115 | 0.4 | 99.6 |
| Catalyst of Ex. 4 | 130 | 240 | 107 | 11.2 | 89.5 |
| | 130 | 270 | 107 | 5.2 | 95.1 |
| | 130 | 285 | 107 | 3.0 | 97.2 |
| | 130 | 305 | 107 | 1.6 | 98.5 |
| | 130 | 325 | 107 | 0.9 | 99.2 |
| | 130 | 345 | 107 | 0.7 | 99.4 |
| | 130 | 365 | 107 | 0.8 | 99.3 |

TEST EXAMPLE 2

Using the catalysts obtained in Examples 1 and 2, life cycle of the catalysts was examined utilizing combustion waste gas of LNG under the conditions shown below. A reactor having an inner diameter of 55 mm. and a length of 150 mm. used. The catalyst in the reactor was in a thickness of 100 mm.

Space Velocity: 10,000 $hr^{-1}$
Temperature: 320°–330° C
Inlet $NO_x$: 50–60 ppm
$NH_3/NO_x$: 1.0–1.5 in a molar ratio
$O_2$: 3–4%

The results are shown in Table 2.

Table 2

| Reaction Time (hr) | | Immediately After Initiation of Reaction | 200 | 400 | 600 | 800 | 1000 | 1200 | 1400 | 1600 | 1800 | 2000 |
|---|---|---|---|---|---|---|---|---|---|---|---|---|
| Reduction Rate | Catalyst of Ex. 1 | 99.0 | 98.7 | 98.5 | 98.0 | 97.6 | 97.5 | 96.0 | 95.8 | 95.2 | 94.6 | 92.4 |
| | Catalyst of Ex. 2 | 98.5 | 98.4 | 98.0 | 97.3 | 96.2 | 93.7 | 90.5 | 87.0 | 86.3 | 85.5 | 83.1 |

TEST EXAMPLES 3 AND 4

Using the catalysts obtained in Examples 3 and 4, life cycle of the catalysts was examined, respectively, with combustion waste gas of LNG under the conditions shown below. A reactor having an inner diameter of 200 mm. and a length of 300 mm. was employed, in which each of the catalysts was filled to a thickness of 100 mm.

Space Velocity: 10,000 $hr^{-1}$
Temperature: Test Example 3, 320° – 325° C; Test Example 4, 310° – 330° C
Inlet $NO_x$: 100 –150 ppm
$NH_3/NO_x$: Test Example 3, 0.8–1.0 in a molar ratio; Test Example 14, 1.0 in a molar ratio
$O_2$: 1–4%

The results are shown in Table 3 below.

Table 3

| Relative Time (hr) | | Immediately After Initiation of Reaction | 200 | 250 | 400 | 500 | 600 | 750 | 800 | 1000 | 1250 | 1500 | 1750 | 2000 (contin.) |
|---|---|---|---|---|---|---|---|---|---|---|---|---|---|---|
| Reduction Rate | Test Example 3 | 99.7 | | | 99.8 | | 99.6 | | 99.4 | | 99.3 | 99.1 | 98.7 | 98.4 | 98.2 |
| | Test Example 4 | 96.0 | 94.8 | | 93.5 | | 92.0 | | 91.1 | 90.5 | — | — | — | — |

| Relative Time (hr) | 2500 | 3000 | 4000 | 5000 | 6000 | 7000 | 8000 |
|---|---|---|---|---|---|---|---|

Reduction Test

Table 3-continued

| Rate | Example 3 | 95.7 | 95.5 | 95.5 | 95.5 | 95.4 | 95.2 | 95.4 |
|---|---|---|---|---|---|---|---|---|
| | Test Example 4 | — | — | — | — | — | — | — |

The naturally occurring tuff powders were treated using different kinds of metal ions as indicated below. Unless otherwise indicated, the tuff having an X-ray diffraction pattern as shown in Table A and the following conditions were used in the examples hereinbelow:
  Powder Size: 6 – 8 mesh
  Amount of Metal Ion Solution: 200 ml. per 100 g. of tuff
  Heat Treatment: 250° – 300° C.
  Space Velocity: 15,000 hr$^{-1}$
  First Immersion in Metal Ion Solution: 100° C., 30 mins.
  Second Immersion in Metal Ion Solution: 100° C., 1 hr.
  Composition of Sample Gas:
    NO: 115 ppm
    $NH_3$: 130 ppm
    $CO_2$: 10%
    $H_2O$: 10%
    $O_2$: 1%
    $N_2$: Balance Similar results were obtained even when the amount of inlet $NO_x$ was varied from 50 to 200 ppm.

EXAMPLE 5

The tuff powders were immersed in a 1 mol/l aqueous $NH_4Cl$ solution at normal temperature for 30 mins. The pretreated tuff was immersed in 1 mol/l $Cu(NO_3)_2$. After heat treatment, the tuff was further immersed in a liquid mixture of 1 mol/l $Fe(NO_3)_3$ and 0.2 mol/l $Mn(NO_3)_2$. The tuff thus treated was again subjected to heat treatment to give a catalyst.

Using the thus obtained catalyst, the reduction rate was examined. The results are shown in the Table 3 below.

Table 3

| Temperature (° C) | 250 | 270 | 290 | 310 | 330 | 350 | 370 |
|---|---|---|---|---|---|---|---|
| Reduction Rate (%) | 87.0 | 93.1 | 96.0 | 98.3 | 99.2 | 99.5 | 99.6 |

EXAMPLE 6

The catalyst was obtained in a manner similar to Example 5 except that the pre-treatment with ammonium chloride was omitted and a liquid mixture of 1 mol/l $Mn(NO_3)_3$ and $Fe(NO_3)_3$ was used at the second immersion. The results are shown in Table 4.

Table 4

| Temperature (° C) | 285 | 310 | 330 | 350 |
|---|---|---|---|---|
| Reduction Rate (%) | 95.1 | 97.7 | 98.2 | 95.4 |

EXAMPLE 7

The catalyst was obtained in a manner similar to Example 5 except that the pre-treatment with ammonium chloride was omitted and a liquid mixture of 1 mol/l $Mn(NO_3)_3$ and $Fe(NO_3)_3$ was used at the second immersion. The results are shown in Table 5.

Table 5

| Temperature (° C) | 285 | 310 | 330 | 350 | 360 |
|---|---|---|---|---|---|
| Reduction Rate (%) | 95.8 | 97.5 | 98.3 | 98.2 | 97.3 |

EXAMPLE 8

The catalyst was obtained in a manner similar to Example 5 except that the pre-treatment with ammonium chloride was omitted and a liquid mixture of 1 mol/l $Mn(NO_3)_3$ and $Ni(NO_3)_3$ was used at the second immersion.

Using the catalyst the reduction rate was examined. The results are shown in Table 6.

Table 6

| Temperature (° C) | 285 | 305 | 335 | 355 | 375 |
|---|---|---|---|---|---|
| Reduction Rate (%) | 95.9 | 98.1 | 99.2 | 99.3 | 98.7 |

EXAMPLE 9

The catalyst was obtained in a manner similar to Example 5 except that the pre-treatment with ammonium chloride was omitted and 1 mol/l $Fe(NO_3)_3$ was used at the second immersion.

Using the catalyst, the reduction rate was examined. The results are shown in Table 7.

Table 7

| Temperature (° C) | 245 | 265 | 285 | 305 | 345 | 365 | 385 |
|---|---|---|---|---|---|---|---|
| Reduction Rate (%) | 90.0 | 94.9 | 97.5 | 99.0 | 99.4 | 99.4 | 97.5 |

EXAMPLE 10

The catalyst was obtained in a manner similar to Example 5 except that the pretreatment with ammonium chloride was omitted and a liquid mixture of 1 mol/l $Ni(NO_3)_3$ and 1 mol/l $Cu(NO_3)_3$ was used at the second immersion.

Using the catalyst the reduction rate was examined. The results are shown in Table 8.

Table 8

| Temperature (° C) | 280 | 300 | 320 | 340 |
|---|---|---|---|---|
| Reduction Rate (%) | 80.2 | 86.1 | 88.8 | 84.9 |

EXAMPLE 11

The tuff powders were immersed in a liquid mixture of 1 mol/l $Cr(NO_3)_3$ and 1 mol/l $Fe(NO_3)_3$. Thereafter, the tuff was subjected to heat treatment to give a catalyst.

Using the thus obtained catalyst, the reduction rate was examined. The results are shown in Table 9.

Table 9

| Temperature (° C) | 280 | 300 | 320 | 340 | 360 |
|---|---|---|---|---|---|
| Reduction Rate (%) | 67.0 | 79.8 | 84.6 | 86.8 | 81.4 |

EXAMPLE 12

The tuff powders were first immersed in 1 mol/l $Cu(NO_3)_3$ at 100° C. for 1 hr., which was followed by heat treatment. The tuff was secondly immersed in 1 mol/l $Fe(NO_3)_3$ at 100° C. for 1 hr., which was followed by heat treatment. Finally, the tuff was immersed in 1 mol/l Mn(NO$_3$)$_2$ at 100° C. for 1 hr. which was again followed by heat treatment to give a catalyst.

Using the thus obtained catalyst, the reduction rate was examined. The results are shown in Table 10.

Table 10

| Temperature (° C) | 260 | 280 | 300 | 320 | 340 | 360 | 380 |
|---|---|---|---|---|---|---|---|
| Reduction Rate (%) | 82.1 | 88.5 | 94.8 | 97.8 | 98.8 | 99.1 | 98.8 |

EXAMPLE 13

The tuff powders were immersed in 1 mol/l NH$_4$VO$_3$ at 100° C. for 1 hr., which was followed by heat treatment. The tuff was again immersed in 1 mol/l Fe(NO$_3$)$_3$ at 100° C. for 1 hr., which was followed by heat treatment to give a catalyst. Using the catalyst the reduction rate was examined. Sample gas further contained 500 ppm of SO$_2$. The results are shown in Table 11.

Table 11

| Temperature (° C) | 250 | 290 | 330 | 370 |
|---|---|---|---|---|
| Reduction Rate (%) | 50.5 | 92.7 | 99.7 | 99.8 |

EXAMPLE 14

The tuff powders were washed with 2N HCl at 100° C for 30 hours using a Soxhlet's extractor and then washed with water. The tuff was immersed in NH$_4$VO$_3$ at 100° C for 1 hour, which was followed by heat treatment. The tuff was then immersed in 1 mol/l Fe(NO$_3$)$_3$ at 100° C for 1 hour. The tuff was subjected to heat treatment to give a catalyst.

Using the thus obtained tuff, the reduction rate was examined. The sample gas having the same composition as in Example 13 was used. The results are shown in Table 12.

Table 12

| Temperature (° C) | 285 | 325 | 365 | 405 |
|---|---|---|---|---|
| Reduction rate (%) | 94.3 | 99.4 | 99.8 | 99.8 |

EXAMPLE 15

The tuff powders having an X-ray diffraction pattern as shown in Table B, of 8-12 mesh, were treated in a manner similar to Example 13 to give a catalyst.

Using the thus obtained catalyst, the reduction rate was examined. The composition of sample gas was as follows:
SO$_2$: 500 ppm
CO$_2$: 10%
H$_2$O: 10%
O$_2$: 1%
NO: 100 ppm
NH$_3$: 130 ppm
N$_2$: Balance The space velocity was 10,000 H$^{-1}$. The results are shown in Table 13.

Table 13

| Temperature (° C) | 225 | 265 | 285 | 305 | 325 | 345 |
|---|---|---|---|---|---|---|
| Reduction Rate (%) | 47.6 | 82.8 | 91.4 | 97.2 | 99.0 | 99.7 |

EXAMPLE 16

Using the catalyst obtained in Example 14, the reduction rate in A heavy oil combustion exhaust gas (which contained 400 ppm of SO$_2$ and 110-150 ppm of NO$_x$) while modifying operation time was examined. The following conditions were used:
Space Velocity: 10,000 hr$^{-1}$
Temperature: 360° - 390° C.
NH$_3$/NO$_x$: 1-2 in a molar ratio
The results are shown in Table 14.

Table 14

| Operation Time (hr.) | 0 | 300 | 600 |
|---|---|---|---|
| Reduction Rate (%) | 98.8 | 94.5 | 96.1 |

As can be seen from the results above, deterioration of the catalyst was minimal.

What is claimed is:

1. A method for reducing the NO$_x$ in an NO$_x$ containing exhaust gas which comprises: contacting said NO$_x$-containing exhaust gas with NH$_3$ in a mol ratio of NH$_3$:NO$_x$ of from about 0.8 : 1 to 2 : 1 at a temperature of above about 200° C and at a space velocity of from about 10,000 to about 15,000 hr$^{-1}$ in the presence of a catalyst comprising a naturally-occurring inorganic material consisting essentially of SiO$_2$, Al$_2$O$_3$, and H$_2$O containing 1 to 10% by weight of an alkali metal oxide and an alkaline earth metal oxide having an X-ray diffraction pattern as shown in Table A or Table B carrying thereon at least two metal ions added thereto in sequence with heat treatment after each sequential addition, said metal ions being selected from the group consisting of metals of Group Ib, Group IIb, Group VIII of the periodic Table, chromium, manganese and vanadium, said naturally-occurring inorganic material having been pretreated with hydrochloric acid prior to addition of said metal ions.

2. The method of claim 1 wherein heat treatment is performed at a temperature of 100° to 700° C after each metal ion addition.

3. The method of claim 2 wherein said naturally occurring inorganic material is pretreated with ammonium ions prior to addition of the metal ions.

4. The process of claim 1 wherein the temperature is from about 200° C to about 405° C.

* * * * *

UNITED STATES PATENT OFFICE
CERTIFICATE OF CORRECTION

Patent No. 4,097,576            Dated June 27, 1978

Inventor(s) Takaaki Tamura, et al

It is certified that error appears in the above-identified patent and that said Letters Patent are hereby corrected as shown below:

In the Title Page, line 2 of inventor information: "Musashinoshi" should be --Tokyo--.

line 4 of inventor information: "Hachiojishi" should be --Tokyo--.

line 2 of assignee information: "Institut" should be --Institute--.

In the Abstract, line 7: "of" should be --on--.

Column 1, line 7: After "to" insert --a--.

line 15: "tuff" should be --tuffs--.

line 20: After "4,013,588" insert -- ) --.

line 35: "economnical" should be --economical--.

line 43: Change "proposed see" to --proposed. See--.

line 59: "Fe-carried" should be --Fe-containing--.

Column 2, line 9: After "occasion" insert --from--.

lines 28 and 29: Delete "or a solution not exceeding 2N HCl and suitably a 1N to 2N HCl solution".

UNITED STATES PATENT OFFICE
CERTIFICATE OF CORRECTION

Patent No. 4,097,576     Dated June 27, 1978

Inventor(s) Takaaki Tamura, et al

It is certified that error appears in the above-identified patent and that said Letters Patent are hereby corrected as shown below:

Column 2, line 47: "10I/I" (both occurrences) should be --$10I/I_o$--.

In Table A, under the first column "Interplanar Spacing A", approximately at line 53: "4.30 35 0.10" should be --4.30 ± 0.10--.

line 65: "10I/I" (both occurrences) should be --$10I/I_o$--.

Column 3, line 4: "10I/I" (both occurrences) should be --$10I/I_o$--.

line 10: "-.05" should be --0.05--.

line 56: "without influenced" should be --without being influenced--.

Column 4, line 65: "powders" should be --powder--.

Column 5, line 22: "powders were" should be --powder was--.

Column 6, line 23: After "150mm." insert --was--.

line 55: "Example 14" should be --Example 4--.

In Table 3, columns 5, 6, 7 & 8 of patent, the headings and entries are incorrectly set out.

UNITED STATES PATENT OFFICE
CERTIFICATE OF CORRECTION

Patent No. 4,097,576

Dated June 27, 1978

Inventor(s) Takaaki Tamura, et al

It is certified that error appears in the above-identified patent and that said Letters Patent are hereby corrected as shown below:

In Table 3, last line of Column 5, delete "Reduction Test".

In Table 3 - continued, Column 7 of patent, "Rate" should be --Reduction Rate--; "Example 3" should be --Test Example 3--.

Signed and Sealed this

Twenty-ninth Day of May 1979

[SEAL]

Attest:

RUTH C. MASON
Attesting Officer

DONALD W. BANNER
Commissioner of Patents and Trademarks